United States Patent
Burchard et al.

(10) Patent No.: US 7,231,340 B2
(45) Date of Patent: Jun. 12, 2007

(54) DYNAMIC MEMORY BUFFER

(75) Inventors: Artur Tadeusz Burchard, Eindhoven (NL); Steven Broeils Luitjens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/568,373

(22) PCT Filed: Aug. 5, 2004

(86) PCT No.: PCT/IB2004/051405

§ 371 (c)(1),
(2), (4) Date: Feb. 14, 2006

(87) PCT Pub. No.: WO2005/020062

PCT Pub. Date: Mar. 3, 2005

(65) Prior Publication Data

US 2006/0195706 A1    Aug. 31, 2006

(30) Foreign Application Priority Data

Aug. 20, 2003    (EP)    .................................. 03102599

(51) Int. Cl.
    *G06F 1/00*    (2006.01)
    *G06F 3/00*    (2006.01)
    *G06F 5/00*    (2006.01)

(52) U.S. Cl. ........................... 703/300; 710/52; 710/56
(58) Field of Classification Search ................ 713/300; 710/56

See application file for complete search history.

(56) References Cited

U.S. PATENT DOCUMENTS

| | | | | |
|---|---|---|---|---|
| 4,258,418 A * | 3/1981 | Heath | ............................ | 710/53 |
| 5,179,662 A * | 1/1993 | Corrigan et al. | ................ | 711/2 |
| 5,367,638 A * | 11/1994 | Niessen et al. | ................ | 710/57 |
| 5,951,658 A * | 9/1999 | Daray et al. | ................... | 710/56 |
| 5,995,462 A * | 11/1999 | Harold-Barry | ............ | 369/53.18 |
| 6,105,070 A * | 8/2000 | Gaylord | ....................... | 709/232 |
| 6,272,589 B1 * | 8/2001 | Aoki | ........................... | 711/112 |
| 6,678,813 B1 * | 1/2004 | Le | ................................ | 711/172 |
| 7,100,057 B2 * | 8/2006 | Won et al. | ................... | 713/300 |
| 2006/0179186 A1 * | 8/2006 | Nye et al. | ...................... | 710/52 |

* cited by examiner

*Primary Examiner*—Thomas C. Lee
*Assistant Examiner*—Ji H. Bae
(74) *Attorney, Agent, or Firm*—Michael E. Belk

(57) ABSTRACT

A dynamic memory buffer buffers between software applications executing on a processor and data generating and/or receiving devices in communication through the buffer with the applications. The buffer includes buffer manager for controlling allocation of one or more portions of the buffer to the applications so as to reduce power dissipation occurring within the devices.

22 Claims, 5 Drawing Sheets

DYNAMIC MEMORY BUFFER

The present invention relates to dynamic memory buffers; in particular, but not exclusively, the invention relates to a dynamic memory buffer for use in resource-constrained multi-application environments where power dissipation is beneficially reduced. Moreover, the invention also relates to a method of reducing power dissipation in such a dynamic memory buffer.

Storage buffers, for example input/output buffers (I/O buffers), are well known; such buffers include first-in first-out (FIFO) registers and memory devices such as static random access memory (SRAM) arranged to perform in a manner akin to such FIFO's. These buffers often find application in connection with mechanical devices such as optical text/picture scanners, CCD imaging devices, printers, magnetic disc drives and optical disc drives. Such mechanical devices are often capable of continuously receiving and/or outputting data at a rate which is significantly dissimilar to that of substantially electronic devices such as microprocessors and associated peripheral components such as decoders. In order to render mechanical devices efficiently operable with substantially electronic devices, such buffers are often used to prevent the mechanically devices and electronic devices from delaying and/or momentarily stalling one another in operation.

When designing systems comprising a combination of substantially electronic devices and mechanical devices, it is well known that choice of the size of storage buffer required to interface between the electronic and mechanical devices beneficially is made taking into consideration data rate handling capacity of the devices. Such considerations are taken into account, for example, when designing apparatus such as portable lap-top computers, and portable audio-visual equipment such as contemporary DVD and MP3 players/recorders.

It is known to allocate input/output buffers dynamically according to anticipated demand. In order that interconnected electronic devices and mechanical devices are not capable of mutually delaying one another on account of relatively different data outputting/receiving rates, it is conventional practice to provide buffers that are considerably larger than a minimum size required to prevent such delay.

However, it is known in the art, for example in a published U.S. Pat. No. 5,951,658, to manage buffering within a data storage system. In the system, a user or/and application program making an I/O request results in the system passing control to its managed buffering facility. During operation of the managed buffering facility, the user or application request is queried to determine how the user/application will be reading or writing the data. Based on the intended use, the system allocates its buffers to the user/application based on intended access to associated data, for example its file size and/or storage device attributes.

The inventors have appreciated for contemporary multi-application and resource-constrained systems, for example user-interactive computing devices, portable computers, consumer audio and/or video equipment and such like, that it is beneficial to include storage buffers therein which are preferably managed with regard to power dissipation arising within the systems. Such management is found to be especially beneficial when the systems are susceptible to executing multiple applications with mutually different streaming bit-rate requirements. In view of such an approach, the inventors have devised the present invention.

The invention is especially suitable for portable devices where available power, for example from rechargeable and/or disposable batteries, is limited and/or where power dissipation within such devices is susceptible to cause thermal loading problems.

A first object of the invention is to provide a dynamic memory buffer which, in combination with a multi-application resource-limited system, is capable of providing reduced power dissipation A second object of the invention is to provide a dynamic memory buffer whose size is dynamically variable depending upon demand placed thereupon whilst attempting to reduce power dissipation arising therein.

According to a first aspect of the present invention, there is provided a dynamic memory buffer for buffering between one or more software applications executing on computing means and one or more data generating and/or receiving devices in communication through the buffer to the one or more applications, the buffer including buffer managing means for controlling allocation of one or more portions of the buffer to the one or more applications so as to reduce power dissipation occurring within the one or more devices.

The invention is of advantage in that it is capable of at least one of reducing power dissipation arising in the one or more devices and ensuring more efficient use of the buffer.

Preferably, in the buffer, the managing means is operable to control allocation of said one or more portions of the buffer in response to data streaming rate demands placed upon the buffer by said one or more applications. Allocation of buffer capacity is especially pertinent to reducing power dissipation when data streaming is occurring.

Preferably, in the buffer, the managing means is operable to control allocation of said one or more portions of the buffer in response to approaching a maximum permissible power dissipation limit for the one or more devices. Determining buffer allocation on the basis of a maximum power threshold is a more straightforward manner for the managing means to control the buffer.

Preferably, in the buffer, the managing means is operable to control allocation of said one or more portions of the buffer in response to multiple fractional power dissipation in the one or more devices, said multiple fractional power dissipation being proportional to corresponding potential asymptotic power dissipation arising for one or more of the applications associated with substantially unlimited buffer memory capacity. More preferably, the multiple fractional power dissipation is within a range of 105% to 300% of corresponding potential asymptotic power dissipation. Most preferably, the multiple fractional power dissipation is substantially 110% of corresponding potential asymptotic power dissipation.

In order to render the buffer more adaptive to unpredictable and/or new types of demand placed thereon, the managing means is implemented as a neural network operable to iteratively reduce power dissipation arising within the one or more devices by deriving a measure of power dissipated in the one or more devices and using said measure to control allocation of the one or more portions of the buffer.

The computing means, the buffer and the one or more devices when operating in conjunction with the one or more software applications executing on the computing means correspond to a multi-application resource-limited system. Such a system is beneficially at least one of an audio and a video apparatus capable of playing and/or recording programmed material.

Preferably, for example to reduce implementation cost and complexity, in the buffer, the managing means is implemented in software executable on at least one of the computing means and said one or more devices.

In the buffer, predetermined data arrays are preferably included in the managing means for use in allocating one or more portions of the buffer to said one or more applications in response to data rate demanded from the one or more applications and/or predetermined power dissipation limits for the one or more devices.

In the buffer, preferably at least part of the buffer comprises an electronic shock protection (ESP) buffer.

Preferably, to reduce dissipation in the one or more devices during data streaming operations, at least one of the devices is arranged to operate in a stop-start switched duty cycle mode when streaming data.

According to a second aspect of the present invention, there is provided a method of controlling a dynamic memory buffer for buffering between one or more software applications executing on computing means and one or more data generating and/or receiving devices in communication through the buffer to the one or more applications, the method including the step of arranging for the buffer to include buffer managing means for controlling allocation of one or more portions of the buffer to the one or more applications so as to reduce power dissipation occurring within the one or more devices.

The method is susceptible to addressing at least one of the aforementioned objects of the invention.

Preferably, in the method, the managing means is operable to control allocation of said one or more portions of the buffer in response to data streaming rate demands placed upon the buffer by said one or more applications.

Preferably, in the method, the managing means is operable to control allocation of said one or more portions of the buffer in response to approaching a maximum permissible power dissipation limit for the one or more devices.

Preferably, in the method, the managing means is operable to control allocation of said one or more portions of the buffer in response to multiple fractional power dissipation in the one or more devices, said multiple fractional power dissipation being proportional to corresponding potential asymptotic power dissipation arising for one or more of the applications arising for substantially unlimited buffer memory capacity. More preferably, in the method, the multiple fractional power dissipation is within a range of 105 to 300% of corresponding potential asymptotic power dissipation. Most preferably, the multiple fractional power dissipation is substantially 110% of corresponding potential asymptotic power dissipation.

Preferably, in the method, the managing means is implemented as a neural network operable to iteratively reduce power dissipation arising within the one or more devices by deriving a measure of power dissipated in the one or more devices and using said measure to control allocation of the one or more portions of the buffer.

Preferably, in the method, the computing means, the buffer and the one or more devices when operating in conjunction with the one or more software applications executing on the computing means correspond to a multi-application resource-limited system.

Preferably, for example to reduce cost and/or simplify application of the method, the managing means is implemented in software executable on at least one of the computing means and said one or more devices.

Preferably, in the method, predetermined data arrays are included in the managing means for use in allocating one or more portions of the buffer to said one or more applications in response to data rate demanded from the one or more applications and/or predetermined power dissipation limits for the one or more devices.

Preferably, for example to cope with mechanical shock when the method is applied to portable devices such as audio CD players, at least part of the buffer comprises an electronic shock protection (ESP) buffer.

Preferably, to provide potentially reduced dissipation during data streaming, at least one of the devices is arranged to operate in a stop-start switched duty cycle mode when streaming data.

It will be appreciated that features of the invention are susceptible to being combined in any combination without departing from the scope of the invention.

Embodiments of the invention will now be described, by way of example only, with reference to the following diagrams wherein.

Figure 3:
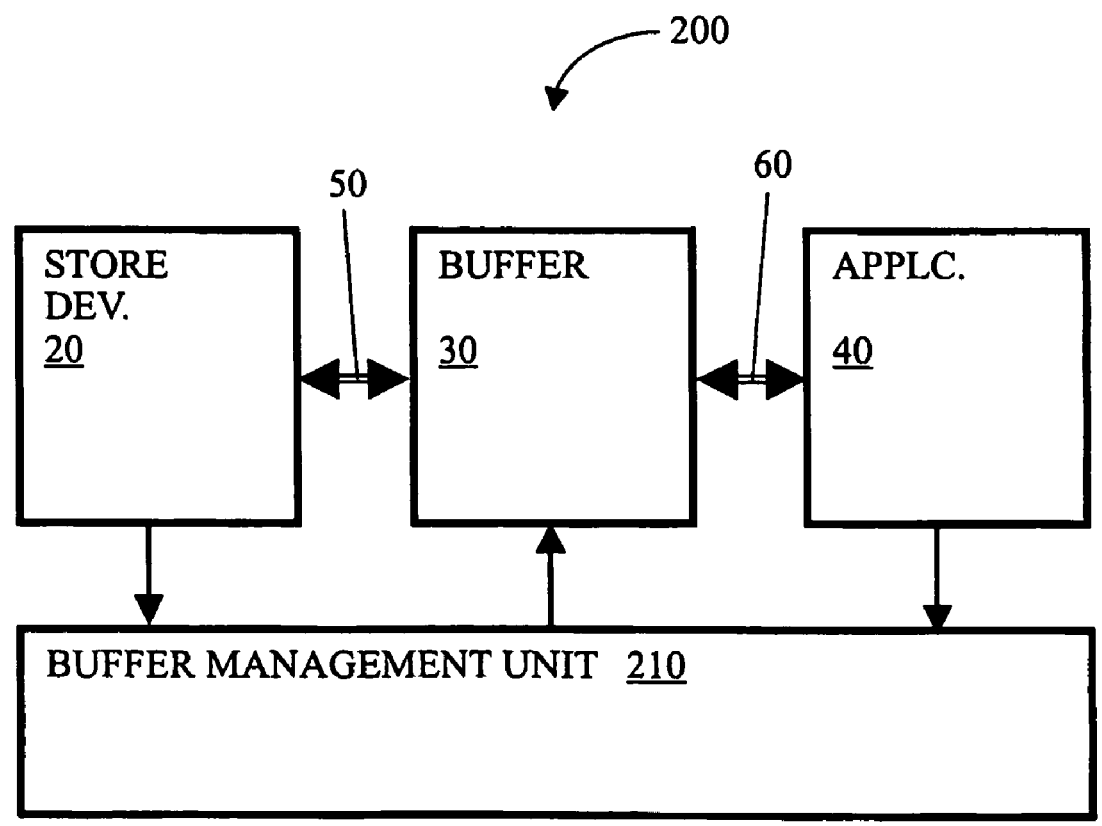
FIG. 3 is a schematic diagram of the configuration of FIG. 1 additionally including a buffer management unit for controlling power-efficient use of the buffer.
Figure 5:
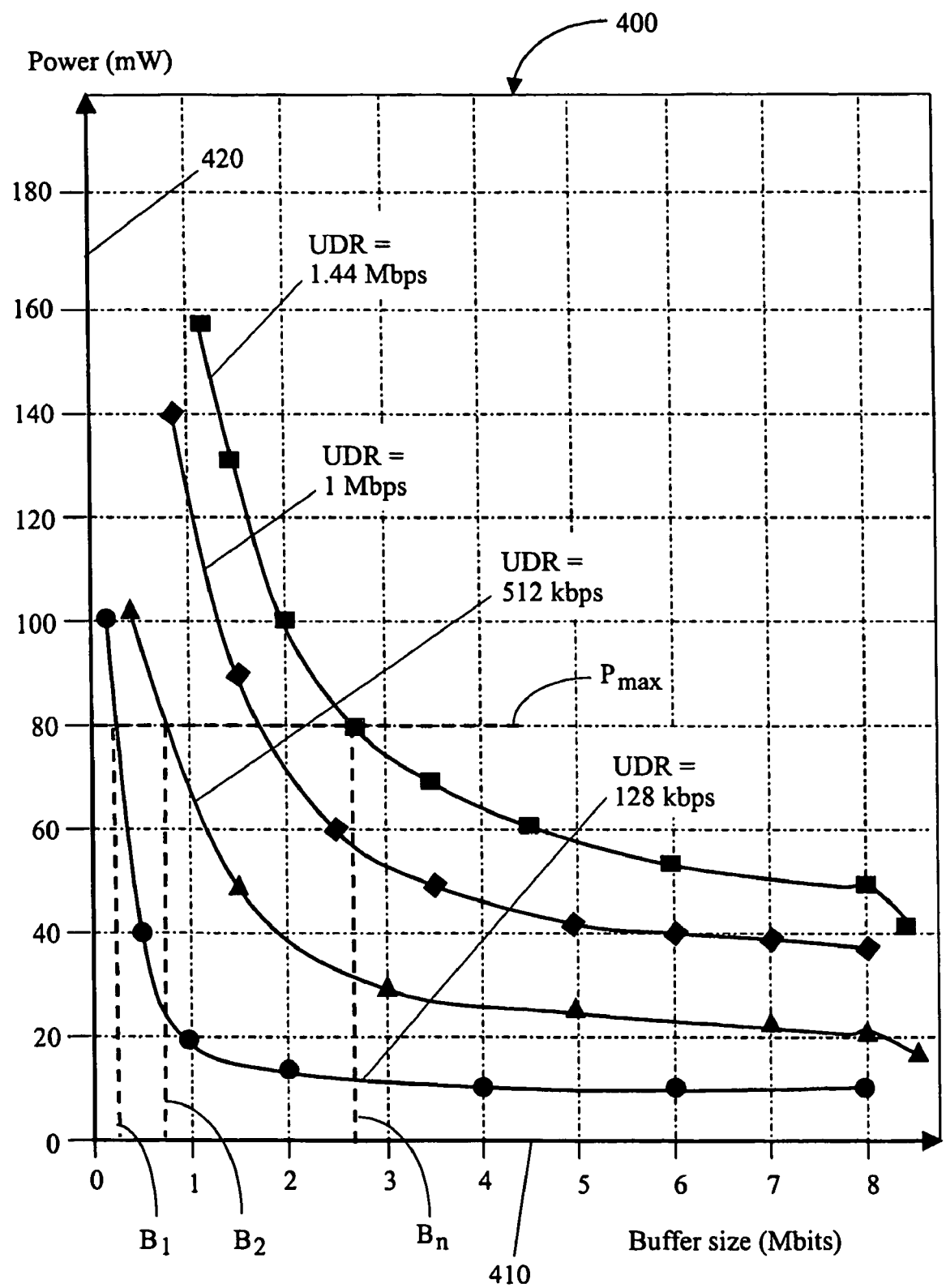
Figure 6:
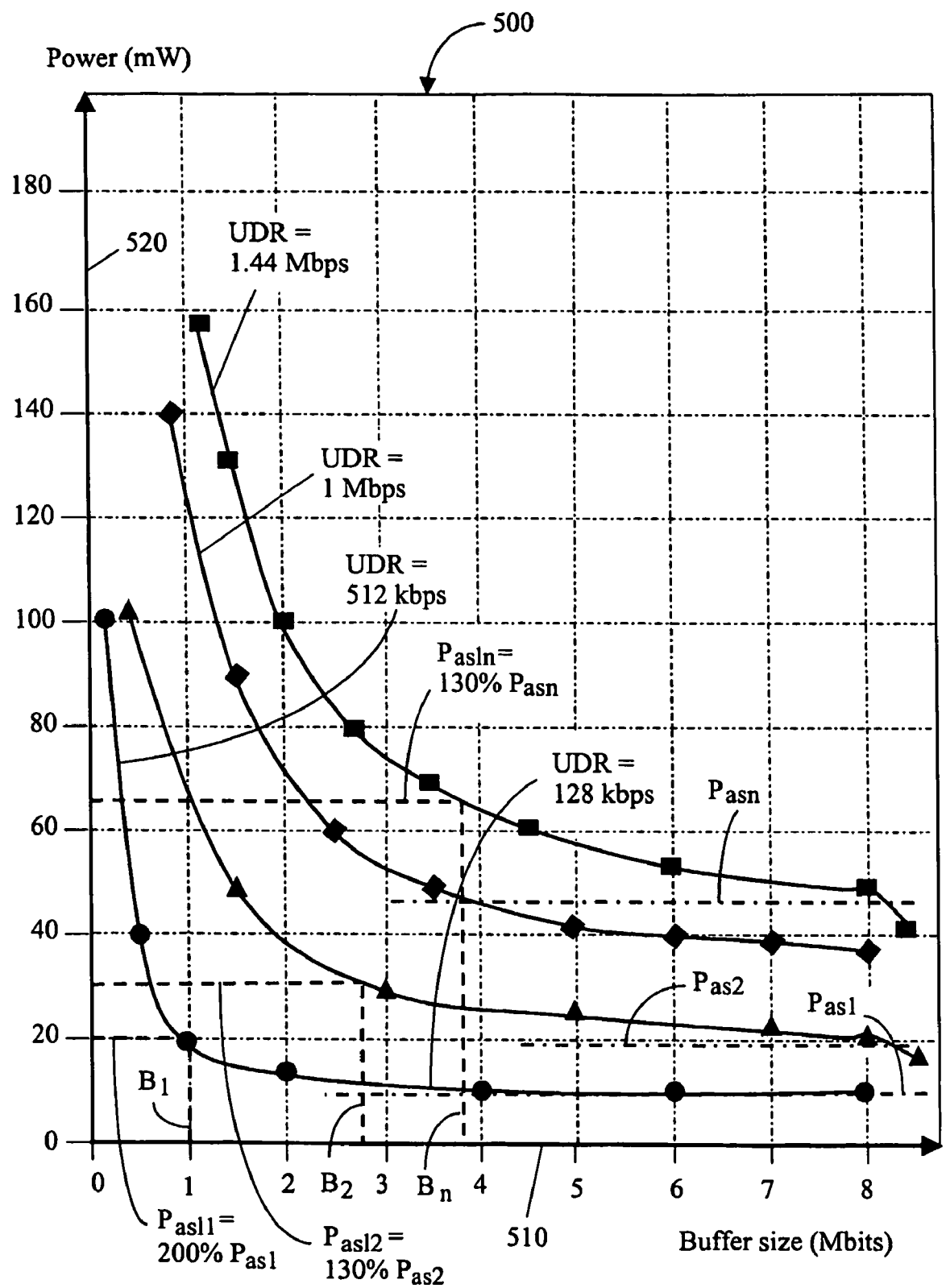

FIG. 5 is a third graph illustrating power dissipation within the memory buffer of FIG. 3 as a function of buffer size, the third graph having markings corresponding to minimum buffer size required for various average transmission data rates to achieve a given power dissipation within the buffer; and FIG. 6 is a fourth graph illustrating power dissipation within the memory buffer of FIG. 3 as a function of buffer size, the fourth graph having markings corresponding to fractional multiples of minimum asymptotic power dissipation and corresponding buffer size corresponding thereto for a range of average transmission data rates.

Figure 1:
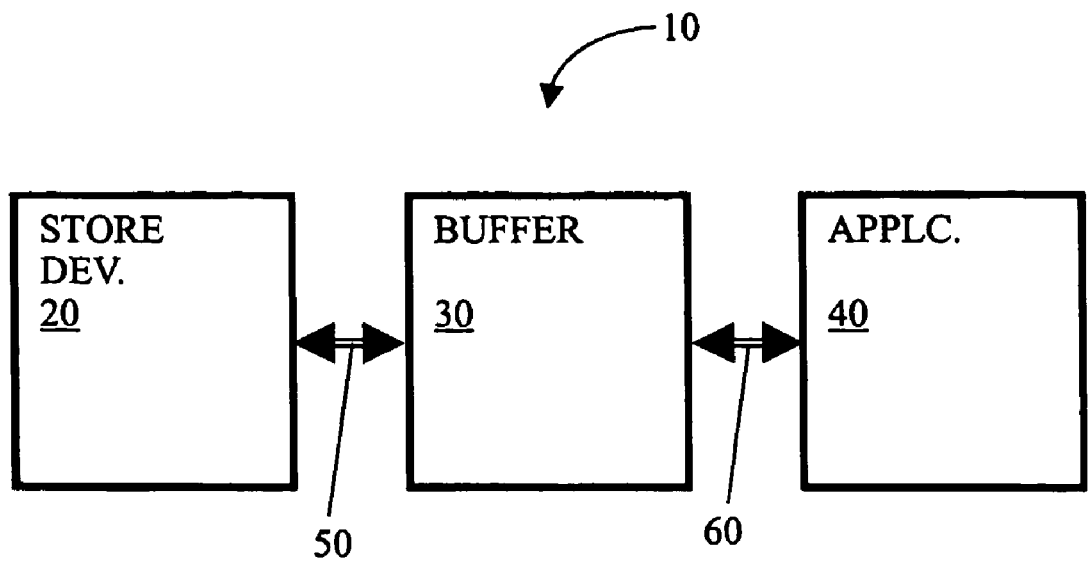
FIG. 1 is a schematic diagram of a configuration comprising a memory buffer interposed between a mechanical device, for example a storage device such as a magnetic and/or optical disc drive, and a software application executing on computing hardware.

The present invention is based on a specific manner in which memory storage devices operate. In FIG. 1, there is shown indicated generally by 10 a storage device configuration. The configuration 10 comprises a storage device (STORE DEV.) 20, a memory buffer (BUFFER) 30, and a group of software applications (APPLC.) 40 comprising one or more individual software applications executing on computer hardware (not shown). The storage device 20 is coupled via a first data connection 50 to a first port of the memory buffer 30. Similarly, the group of software applications 40 is linked through its computer hardware and via a second data connection 60 to a second port of the buffer 30.

The buffer 30 is susceptible, as an alternative, to being provided with a single bi-directional port for handling both data input thereto and data output therefrom in an interleaved manner, for example as off-chip dynamic random access memory (DRAM).

Data flow is susceptible to occurring in operation mono-directionally or bi-directionally across the buffer 30. The buffer 30 is preferably implemented by at least one of on-chip semiconductor static random access memory (SRAM) and off-chip semiconductor static dynamic random access memory (SDRAM). Additionally, or alternatively, the buffer 30 is implemented by DRAM although other technologies are also feasible, for example magnetic memory. The group of software applications 40 is susceptible, for example, to being at least one of audio playback, video playback, audio recording and video recording.

Of particular pertinence to the present invention is when the storage device 20 is implemented as one or more mechanical storage drives, for example as one or more magnetic hard disc units and optical disc units. Such drives have a certain maximum bit rate $BR_{max}$ at which they are capable of accessing data stored in a physical medium and/or writing data to the medium, for example magnetic domains in a magnetizable magnetic layer. Moreover, this maximum bit rate $BR_{max}$ is different for different types of storage device. Furthermore, these drives each have an associated minimum energy threshold power $P_{min}$ which they dissipate when in operation. The threshold power $P_{min}$ comprises, for example, one or more of mechanical actuation and optical excitation. Mechanical actuation includes electrical motors for rotating a magnetic or optical disc relative to an associated reading/writing head. Similarly, optical excitation includes lasing currents required to cause solid state lasers to laze for data writing and/or readout in a stable manner and also photodetector amplifier bias currents. The minimum power $P_{min}$ is substantially independent of data bit rate output or capable of being received by the drive.

Modifying such drives to function at higher bit rates generally adds incrementally to the minimum power $P_{min}$, for example in a manner substantially as described by Equation 1 (Eq. 1):

$$P_{drive} = P_{min} + (K_0 \cdot BR_{max}) \quad \text{(Eq. 1)}$$

where $P_{drive}$=power consumed by the drive in operation; and
$K_0$=proportionality coefficient.

For certain types of drives, the power $P_{drive}$ consumed by the drive is potentially a higher order polynomial function of the maximum bit rate $BR_{max}$ rather than being a linear function as provided in Equation 1. Moreover, certain types of drive require some initial time, with corresponding power consumption, to start up; for example, optical disc drives include electric motors which require time to accelerate their optical discs to an appropriate angular velocity for stable data retrieval therefrom and/or reliable data writing thereto. An example of a proprietary drive substantially described by Equation 1 for constant operation is a Philips proprietary "Portable Blue" drive based on solid-state blue laser technology which is a miniature version of its "Blu-Ray" optical drive configuration capable of 30 Mega-bits-per-second (30 Mbps) maximum read-out bit rate. Such a read-out rate is faster than many electronic devices such as decoders are capable of processing.

Operation of such drives is also appropriately considered in conjunction with one or more software applications corresponding to the group of applications 40 in FIG. 1, such one or more applications executing on computing hardware and being operable to access one or more such drives. When the applications communicate with the one or more drives for random access of data therein and/or random writing of data thereto, namely in a first mode of operation of the configuration 10, the one or more drives are beneficially operated at maximum speed, namely maximum bit rate $BR_{max}$, in order not to delay the applications more than absolutely necessary; in such a first mode of operation, inclusion of the buffer 30 is not able to reduce power dissipation arising within the configuration 10.

In contradistinction, namely in a second mode of operation, one or more of the applications may require to access the one or more drives in a "streaming" manner where an average rate of data readout from and/or writing to the one or more drives is lower than their maximum bit rate $BR_{max}$. The present invention is especially relevant to the second mode of operation because inclusion of the buffer 30 is then susceptible to reducing power dissipation arising within the configuration 10.

Practical examples of where drives are utilized in a "streaming" manner is in audio-visual equipment such as contemporary Digital Video Disc (DVD) apparatus and Compact Disc (CD) apparatus. In audio playback, average "streaming" data rates in a range of 128 to 1440 kilo-bits-per-second (kbps) are often encountered. Similarly, in video playback, average "streaming" data rates starting from 384 kbps and above are often encountered.

When the configuration 10 is operated in a streaming manner, the inventors have appreciated that inclusion of the buffer 30 avoids the storage device 20 being operated continuously to service the maximum bit rate from the one or more applications. In other words, inclusion of the buffer 30 enables the device 20 to function in an stop-start manner having a duty cycle D as provided by Equation 2 (Eq. 2):

$$D = \left(\frac{T_{ON}}{T_{OFF} + T_{ON}}\right) \quad \text{(Eq. 2)}$$

where $T_{ON}$=average time period that the device 20 is operating at maximum bit rate $BR_{max}$ during streaming; and
$T_{OFF}$=average time period that the device 20 is operating in a powered-down state during streaming.

Thus, the peak bit-rate at which the buffer 30 receives and/or delivers data to the device 20 is $BR_{max}$, whereas the average rate of data delivery to and/or from the device 20 is $BR_{avr}$ provided by Equation 3 (Eq. 3):

$$BR_{avr} = D \cdot BR_{max} \quad \text{(Eq. 3)}$$

with an average power consumption $P_{avr}$ approximately calculable from Equation 4 (Eq. 4):

$$P_{avr} = D \cdot [P_{min} + (K_0 \cdot BR_{max})] + (1-D) \cdot P_{off} \quad \text{(Eq. 4)}$$

ignoring energy dissipation at initial start-up for each ON-period, $T_{ON}$; $P_{off}$ is a standby power dissipation arising within the device 20 when in its OFF state.

If the device 20 where designed to operate continuously at the average bit rate $BR_{avr}$, and provide and/or receive data continuously at this rate, its equivalent power consumption $P_{eq}$ is calculable from Equation 1 as provided in Equation 5 (Eq. 5):

$$P_{eq} = P_{min} + (K_0 \cdot BR_{avr}) \quad \text{(Eq. 5)}$$

The present invention relating to the aforementioned second mode of operation relies on the power $P_{avr}$ from Equation 4 based on start-stop mode of operation being less than the power $P_{eq}$ for the device 20 designed to operate continuously at the average bit rate $BR_{avr}$ during data streaming via the buffer 30 to and/or from the application 40; in other words, the present invention relies on $P_{avr} < P_{eq}$.

The invention is further based on an appreciation by the inventors that Equation 4 above is an approximation which ignores initial power dissipation $P_{start}$ at the beginning of each ON-period $T_{ON}$. A more accurate indication of average power usage $P_{avr}$ in the device is provided in Equation 6 (Eq. 6):

$$P_{avr} = \left(\frac{P_{start}}{T_{ON} + T_{OFF}}\right) + D \cdot [P_{min} + K_0 \cdot BR_{max}] + \qquad \text{(Eq. 6)}$$
$$(1 - D) \cdot P_{off}$$

Figure 2:
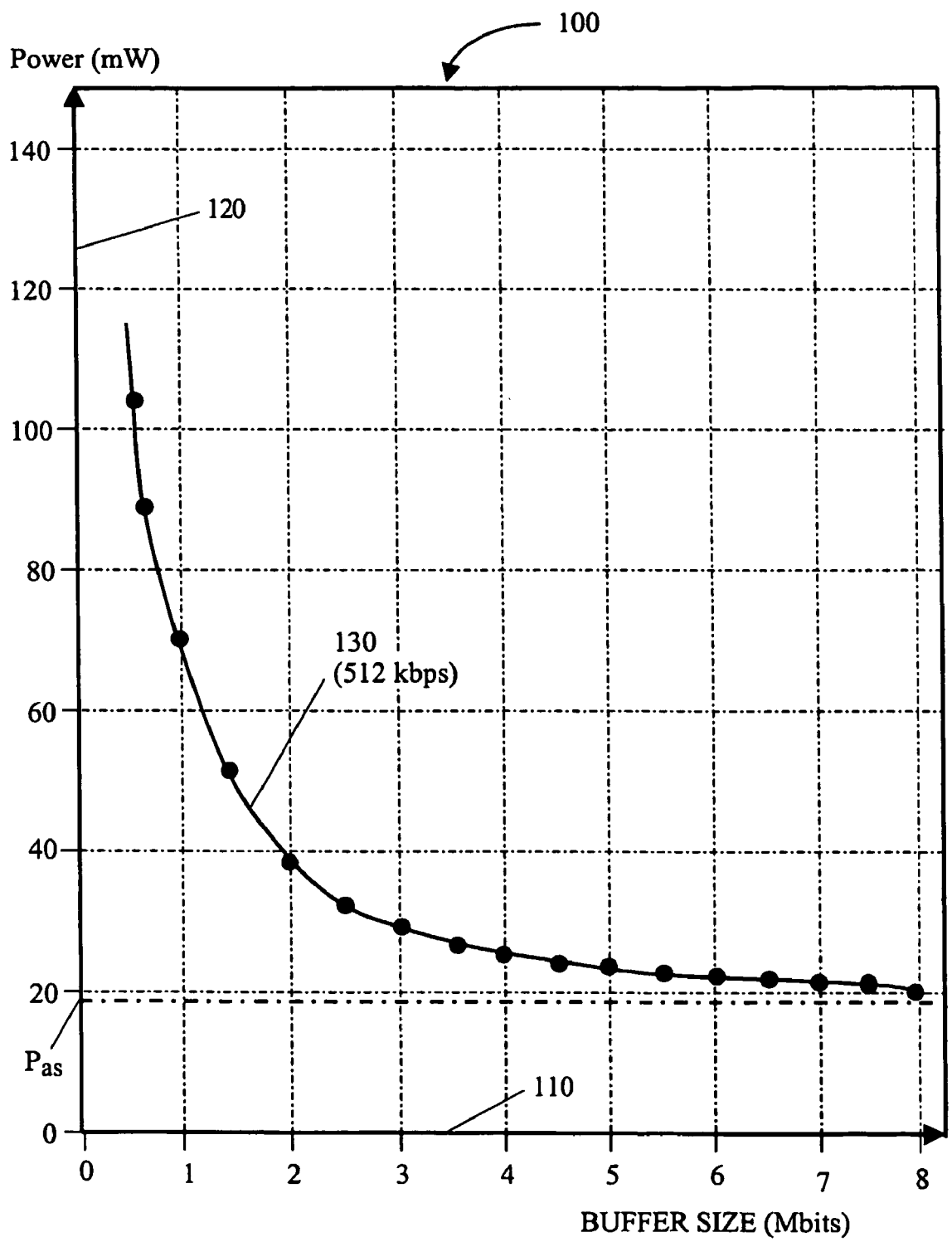
FIG. 2 is a first graph illustrating power dissipation arising within a memory buffer as a function of buffer size for an average streamed data rate transmission therethrough of 512 kilobits per second (512 kbps)

Equation 6 describes a form of power curve to be seen in FIG. 2 wherein a graph is indicated by 100. The graph 100 includes an abscissa axis 110 denoting size of the buffer 30, and an ordinate axis 120 denoting power dissipation arising within the device 20. In practice, a slightly more complex model pertains because a large size of the buffer 30 also has associated therewith a higher power consumption although such consumption is to be regarded as a secondary effect relative to power consumption arising within the device 20. A power curve 130 corresponds to a average bit rate $B_{avr}$ from and/or to the device 20 of 512 kilo-bits-per-second. It will be seen from the curve 130 that power dissipation within the configuration 10 increases rapidly as the size of its buffer 30 is reduced below 2 Megabits (Mb). Above 2 Mbps, power consumption decreases asymptotically towards a minimum power consumption denoted by $P_{as}$.

In the configuration 10, the size of the buffer 30 has to be finite for practical reasons, for example for cost considerations where the configuration 20 corresponds to an inexpensive mass-produced consumer product. On the one hand, the size of buffer 30 is beneficially selected to comply with a given power budget for the configuration 10; such buffer size selection will be further elucidated later with reference to FIG. 5. On the other hand, the inventors have appreciated that a compromise between buffer size and power dissipation arising within the configuration 10 can also be reached in several alternative ways, for example:

(a) a compromise can be selected at a certain fractional multiple of the asymptotic value $P_{as}$ such as 1.3 times the value $P_{as}$; or (b) a compromise can be selected where the curve 130 substantially is similar to the value $P_{as}$.

The inventors have further appreciated that the curve 130 is an over-simplification where the configuration 10 corresponds to a multi-application environment, namely that the group of applications 40 in FIG. 1 corresponds to multiple concurrently-executing software application, wherein each of the multiple applications desires access via the buffer 30 to the device 20. In such a multi-application environment, calculation of an optimal buffer size is further complicated because the multiple applications are potentially operable to access the device 20 at mutually different average bit rates. As described earlier, the buffer 30 itself is a significant cost; arranging for the buffer 30 to be excessively large is uneconomical, whereas arranging for the buffer 30 to be too small causes saturation of the buffer 30 when multi-applications are being executed within the configuration 10.

Thus, the inventors have appreciated that configurations executing a plurality of software applications denoted by 1 to n having mutually different associated bit rate requirements with regard to storage device access provided with an intermediate buffer that optimal buffer sizes, for example buffer sizes $B_1, B_2, \ldots B_n$, that their corresponding contributions to storage device power dissipation $P_1, P_2, \ldots P_n$, are susceptible to being separately and individually calculable for purposes of overall buffer size required to service the applications whilst also optimizing power dissipation within the storage device 20. In order to elucidate the present invention further, FIG. 3 will now be described.

In FIG. 3, there is shown a configuration comprising the device 20, the buffer 30 and the group of applications 40 of the configuration 10 illustrated in FIG. 1. The configuration 200 further comprises a buffer management unit 210 coupled to the device 20, the buffer 30 and the computing hardware in which the group of applications 40 is executed. The unit 210 is operable to manage the size of regions of the buffer 30 allocated to each of the applications in the group 40 so as to try to reduce power dissipation arising within the device 20.

The unit 210 is operable to calculate dynamically the size of the buffer 30 that is needed for each individual application in the group 40 and to allocate a portion of the buffer 30 for streaming data communication between the application and the device 20 prior to such communication commencing. Thus, the portion of the buffer 30 allocated for streaming purposes to each application in the group 40 remains preferably unchanged provided that the data rate of the application is constant; if the application data rate is modified, for example by request of the application itself, the unit 210 is preferably operable to re-calculate an appropriate portion of the buffer 30 and then re-allocate this portion to the application. The unit 210 employs as main parameters, for determining appropriate allocation of the buffer 30:

(a) the bit rate of the application; and (b) desired power dissipation of the device 20.

By using these main parameters, it is feasible according to the invention to provide a solution for dynamic management of the buffer 30 to better optimize its size for desired data streaming purposes. Such dynamic management pertains to data both being read from the device 20 and written to the device 20. It will also be appreciated that many storage devices exhibit mutually different rates of reading data from the device 20 in comparison to writing data to the device 20; such differences in read/writing speed within the device 20 is susceptible to resulting in mutually different power dissipation arising within the device 20 in operation.

In order to elucidate further operation of the management unit 210, FIG. 4 will now be described.

Figure 4:
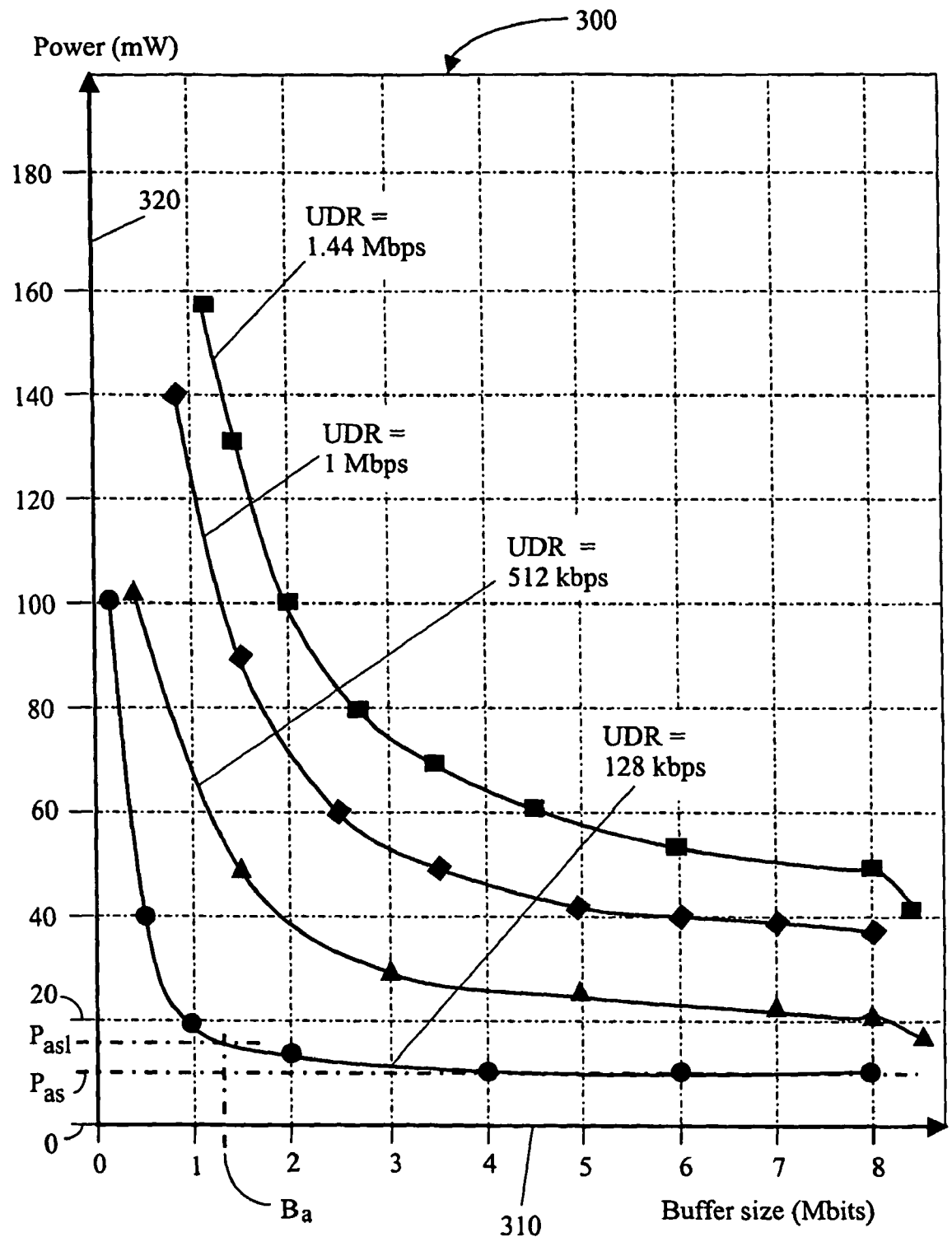
FIG. 4 is a second graph illustrating change in power dissipation within the memory buffer of FIG. 3 as a function of buffer size for a variety of mutually different average transmission data rates in a range of 128 kilobits per second (128 kbps) to 1.44 Megabits per second (1.44 Mbps) therethrough.

In FIG. 4, there is shown a graph indicated generally by 300. The graph 300 includes an abscissa axis 310 denoting memory capacity of the buffer 30, and an ordinate axis 320 denoting power dissipation arising within the device 20. The graph 300 illustrates a relationship between the size of the buffer 30 and associated power dissipation in the device 20 for several mutually different average data streaming rates (UDR) through the buffer, namely 128 kilo-bits-per second (kbps), 512 kbps, 1 Mega-bits-per-second (Mbps) and 1.44 Mbps.

It will be seen from FIG. 4 that the curves of the graph are of generally decreasing asymptotic form as buffer size increases. For each curve, there is an associated asymptotic value; for example, the curve for 128 kbps data rate has an asymptotic value $P_{as}$ in the order of 10 mW. Moreover, to achieve at an example power limit of $P_{asl}$, namely 16 mW, there is a requirement to provide a portion of the buffer 30 having a capacity of $B_a$ bits, namely 1.3 Mbits for example. In this example, the power limit $P_{asl}$ is said to be a fractional multiple of the asymptotic value Pas, namely $P_{asl}=1.6 \times P_{as}$. Other examples of fractional multiples are feasible as will be elucidated in greater detail later.

In the configuration 200, computing hardware concurrently executes "n" software applications requiring corresponding portions of the buffer 30, the portions being of size $B_1$ to $B_n$. Use of the buffer 30 for each of the "n" applications results in corresponding power dissipations $P_1$ to $P_n$ in the device 20. In a simple model of the configuration 200, a summation of the individual power dissipation $P_1$ and $P_n$ provides a very approximate indication of total power dissipation $P_{sum}$ arising within the configuration 200 as in Equation 7 (Eq. 7):

$$P_{sum} = \sum_{i=1}^{n} P_i \qquad \text{(Eq. 7)}$$

However, calculation of the total dissipation arising within the device 20 for multiple concurrently executing applications is in practice much more complex than depicted in Equation 7.

Thus, the management unit 210 is provided with a power model of the configuration 200. This model is needed by the unit 210 to calculate an optimal portion of the buffer 30, namely $B_{opt}$, required to service an application data rate R. The power model is preferably implemented in the form of a mathematical function embedded in software executed in the management unit 210, the model being arranged to receive the data rate R as an input parameter. Alternatively, or additionally, the power model is susceptible to being implemented as a pre-calculated table prepared during initial design of the configuration 200. Such a table preferably comprises several values for the optimal buffer size $B_{opt}$ that correspond to certain values of the rate R; these several values are preferable discrete values and/or ranges. Yet more preferably, such a power model is susceptible to residing in the device 20 itself and/or in the computing hardware in which the group of applications 40 is executed. Beneficially, the management unit 210 is susceptible to being provided as a special further software application executing on the aforementioned computer hardware.

In the configuration 200 arranged to execute software applications whose nature and data rate demands on the device 20 are not known beforehand, the management unit 210 is susceptible to being implemented as an intelligent neural network arranged to monitor the total power dissipation within the device 20 for various data rate demands R and iteratively allocating buffer capacity to reduce the power dissipation. Preferably, such a neural network is implemented in software and provided with approximately suitable buffer sizes to use when iterating an optical buffer allocation to reduce overall power dissipation.

The calculation of the optimal buffer size $B_{opt}$ for certain application data rates is susceptible to being implemented in a software decision process executing closely with a file system employed to operate the device 20. In such an arrangement, one or more software applications of the group 40 executing on the aforementioned computing hardware is preferably operable to send information to the decision process indicative of whether or not access to the device 20 is a streaming requirement and to declare one or more data rates at which an associated application in the group 40 is desirous to access the device 20. The decision process calculates the optimal buffer size $B_{opt}$ using the aforementioned power model and then allocates an appropriate portion of the buffer 30. Preferably, both the one or more software applications and the device 20 receive information regarding buffer memory addresses corresponding to the allocated portion of the buffer 30.

An issue is the manner in which the decision process functions. Optimization of power dissipation arising in the device 20 is solvable in several ways. The power calculation undertaken by the decision process is beneficially made identical to a static situation where data rates R are not varied. However, the inventors have identified two approaches which are regarded as being especially preferred, namely a first power budget approach and a second mutual separate allocation approach. Each of these two processes will now be further elucidated with reference to FIGS. 5 and 6.

Referring to FIG. 5, there is shown a graph indicated generally by 400. The graph 400 includes an abscissa axis 410 corresponding to allocated size of the buffer 30. Moreover, the graph 400 includes an ordinate axis 420 corresponding to power dissipation arising within the device 20 of the configuration 200. Power dissipation curves are presented corresponding to streamed data rates of 128 kilo-bits-per-second (kbps), 512 kbps, 1 Mega-bits-per-second (Mbps) and 1.44 Mbps. In the graph 400, there is also shown a power limit denoted by $P_{max}$ and corresponding buffer sizes $B_1$, $B_2$, $B_n$ required to reach this power limit $P_{max}$ for the data rates of 128 kbps, 512 kbps and 1.44 Mbps respectively.

In the first approach, the power budget $P_{max}$ is assigned at a preferred magnitude that can be dissipated but not exceeded. Then, for the applications of the group 40 being executed, there is calculated corresponding optimal buffer sizes $B_1$, $B_2$, $B_n$ according to the graph 400.

Referring to FIG. 6, there is shown a graph indicated generally by 500. In a similar manner to FIG. 5, the graph 500 of FIG. 6 includes an abscissa axis 510 corresponding to allocated size of the buffer 30. Moreover, the graph 500 includes an ordinate axis 520 corresponding to power dissipation arising within the device 20 of the configuration 200. Power dissipation curves are presented corresponding to streamed data rates of 128 kilo-bits-per-second (kbps), 512 kbps, 1 Mega-bits-per-second (Mbps) and 1.44 Mbps.

The curves of the graph 500 have asymptotic values for associated power dissipation as the size of the buffer 30 is made very large. Such asymptotic values are denoted by $P_{as1}$, ... $P_{as2}$, ... $P_{asn}$, for example for data rates of 128 kbps, 512 kbps and 1.44 Mbps respectively. The second approach involves selecting corresponding buffer sizes $B_1$, $B_2$, ... $B_n$ to be fractional multiple values of these asymptotic values, namely $P_{as11}$, $P_{as12}$ and $P_{asln}$ such that these are substantially fractional multiples 200% $P_{as1}$, 130% $P_{as2}$ and 130% $P_{asn}$ respectively as illustrated. However, it will be appreciated that other fractional amounts can be selected, for example in a range of 105% to 300%. Moreover, if required, the fractional amounts can be made mutually different for different data rates R as illustrated.

In the foregoing, selection of optimal buffer size is based on the configuration 200 being devoid of any Electronic Shock Protection (ESP) buffer. However, when an ESP buffer is included, portions of the ESP buffer can be allocated to software applications in a similar as described above for the present invention. For a given duration of shock protection provided by such an ESP buffer, the ESP buffer size allocated can be made a function of data rate R being handled.

It will be appreciated that embodiments of the invention described in the foregoing are susceptible to being modified without departing from the scope of the invention.

In the foregoing, expressions such as "contain", "include", "comprise", "incorporate", "has", "have", "is" and "are" are employed, such expressions for the purpose of elucidating the present invention to be construed to be non-exclusive, namely allow for the possibility of one or

The invention claimed is:

1. A dynamic memory butter for buffering between one or more software applications executing on computing means and one or more data generating and/or receiving devices in communication through the buffer to the one or more applications, the buffer including buffer managing means for controlling allocation of one or more portions of the buffer to the one or more applications so as to reduce power dissipation occurring within the one or more devices, wherein the managing means are implemented as a neural network operable to iteratively reduce power dissipation arising within the one or more devices by deriving a measure of power dissipated in the one or more devices and using said measure to control allocation of the one or more portions of the buffer.

2. The buffer according to claim 1, wherein the managing means are operable to control allocation of said one or more portions of the buffer in response to data streaming rate demands placed upon the buffer by said one or more applications.

3. The buffer according to claim 1, wherein the managing means are operable to control allocation of said one or more portions of the buffer in response to approaching a maximum permissible power dissipation limit for the one or more devices.

4. A buffer for buffering between one or more software applications executing on computing means and one or more data generating and/or receiving devices in communication through the buffer to the one or more applications, the buffer including buffer managing means for controlling allocation of one or more portions of the buffer to the one or more applications so as to reduce power dissipation occurring within the one or more devices, wherein the managing means are operable to control allocation of said one or more portions of the buffer in response to multiple fractional power dissipation in the one or more devices, said fractional power dissipation being proportional to corresponding potential asymptotic power dissipation arising for one or more of the applications associated with substantially unlimited buffer memory capacity.

5. The buffer according to claim 4, wherein the multiple fractional power dissipation is within a range of 105% to 300% of corresponding potential asymptotic power dissipation.

6. The buffer according to claim 5, wherein the multiple fractional power dissipation is substantially 110% of corresponding potential asymptotic power dissipation.

7. The buffer according to claim 1, wherein the computing means, the buffer and the one or more devices when operating in conjunction with the one or more software applications executing on the computing means correspond to a multi-application resource-limited system.

8. The buffer according to claim 1, wherein the managing means are implemented in software executable on at least one of the computing means and said one or more devices.

9. The buffer according to claim 8, wherein predetermined data arrays are included in the managing means for use in allocating one or more portions of the buffer to said one or more applications in response to data rate demanded from the one or more applications and/or predetermined power dissipation limits for the one or more devices.

10. The buffer according to claim 1, wherein at least part of the buffer comprises an electronic shock protection (ESP) buffer.

11. The buffer according to claim 1, wherein at least one of the devices is arranged to operate in a stop-start switched duty cycle mode when streaming data.

12. A method of controlling a dynamic memory buffer for buffering between one or more software applications executing on computing means and one or more data generating and/or receiving devices in communication through the butter to the one or more applications, the method including the step of arranging for the buffer to include buffer managing means for controlling allocation of one or more portions of the buffer to the one or more applications so as to reduce power dissipation occurring within the one or more devices, wherein the managing means are implemented as a neural network operable to iteratively reduce power dissipation arising within the one or more devices by deriving a measure of power dissipated in the one or more devices and using said measure to control allocation of the one or more portions of the buffer.

13. The method according to claim 12, wherein the managing means are operable to control allocation of said one or more portions of the buffer in response to data streaming rate demands placed upon the buffer by said one or more applications.

14. The method according to claim 12, wherein the managing means are operable to control allocation of said one or more portions of the buffer in response to approaching a maximum permissible power dissipation limit for the one or more devices.

15. A method of controlling a dynamic memory buffer for buffering between one or more software applications executing on computing means and one or more data generating and/or receiving devices in communication through the buffer to the one or more applications, the method including the step of arranging for the buffer to include buffer managing means for controlling allocation of one or more portions of the buffer to the one or more applications so as to reduce power dissipation occurring within the one or more devices, wherein the managing means are operable to control allocation of said one or more portions of the buffer in response to multiple fractional power dissipation in the one or more devices, said multiple fractional power dissipation being proportional to corresponding potential asymptotic power dissipation arising for one or more of the applications arising for substantially unlimited buffer memory capacity.

16. The method according to claim 15, wherein the multiple fractional power dissipation is within a range of 105% to 300% of corresponding potential asymptotic power dissipation.

17. The method according to claim 16, wherein the multiple fractional power dissipation is substantially 110% of corresponding potential asymptotic power dissipation.

18. The method according to claim 12, wherein the computing means, the buffer and the one or more devices when operating in conjunction with the one or more software applications executing on the computing means correspond to a multi-application resource-limited system.

19. The method according to claim 12, wherein the managing means are implemented in software executable on at least one of the computing means and said one or more devices.

20. The method according to claim 19, wherein predetermined data arrays are included in the managing means for use in allocating one or more portions of the buffer to said one or more applications in response to data rate demanded from the one or more applications and/or predetermined power dissipation limits for the one or more devices.

21. The method according to claim 12, wherein at least part of the buffer comprises an electronic shock protection (ESP) buffer.

22. The method according to claim 12, wherein at least one of the devices is arranged to operate in a stop-start switched duty cycle mode when streaming data.

* * * * *